United States Patent
Akiyama et al.

(10) Patent No.: US 7,764,592 B2
(45) Date of Patent: Jul. 27, 2010

(54) OPTICAL RECORDING MEDIUM, METHOD FOR MANUFACTURING THE SAME, RECORDING/PLAYBACK METHOD, AND RECORDING/PLAYBACK APPARATUS

(75) Inventors: Tetsuya Akiyama, Hirakata (JP); Naoyasu Miyagawa, Kawanishi (JP); Shinya Abe, Kadoma (JP); Takashi Ishida, Yawata (JP)

(73) Assignee: Panasonic Corporation, Osaka (JP)

( * ) Notice: Subject to any disclaimer, the term of this patent is extended or adjusted under 35 U.S.C. 154(b) by 1000 days.

(21) Appl. No.: 11/068,752

(22) Filed: Mar. 2, 2005

(65) Prior Publication Data
US 2005/0195731 A1    Sep. 8, 2005

(30) Foreign Application Priority Data
Mar. 8, 2004    (JP) .............................. 2004-063517

(51) Int. Cl.
*G11B 7/24* (2006.01)
(52) U.S. Cl. .................................................. 369/275.1
(58) Field of Classification Search ............... 369/275.4, 369/275.5, 275.3, 53.2
See application file for complete search history.

(56) References Cited

U.S. PATENT DOCUMENTS

| | | | | |
|---|---|---|---|---|
| 5,645,909 | A * | 7/1997 | Kobayashi et al. | 428/64.1 |
| 6,442,123 | B1 * | 8/2002 | Nishimoto | 369/112.01 |
| 7,353,528 | B2 * | 4/2008 | Hayashibe et al. | 720/718 |
| 2002/0150394 | A1 | 10/2002 | Osakabe | |
| 2002/0167871 | A1 | 11/2002 | Yamakage | |
| 2003/0161248 | A1 * | 8/2003 | Ohno | 369/109.01 |
| 2003/0202436 | A1 | 10/2003 | Tomita et al. | |
| 2004/0013069 | A1 * | 1/2004 | Uno et al. | 369/59.11 |
| 2004/0165523 | A1 * | 8/2004 | Shimofuku | 369/275.4 |
| 2004/0187145 | A1 * | 9/2004 | Tanaka et al. | 720/718 |
| 2005/0002321 | A1 * | 1/2005 | Ishida et al. | 369/275.4 |
| 2006/0044995 | A1 | 3/2006 | Tieke et al. | |
| 2006/0098558 | A1 | 5/2006 | Kobayashi et al. | |
| 2006/0280071 | A1 * | 12/2006 | Meinders et al. | 369/47.5 |

FOREIGN PATENT DOCUMENTS

EP    1 047 057    10/2000

(Continued)

OTHER PUBLICATIONS

Japanese Office Action issued May 19, 2009 in corresponding Japanese Application 2005-035456.

*Primary Examiner*—Joseph H Feild
*Assistant Examiner*—Henok G Heyi
(74) *Attorney, Agent, or Firm*—Wenderoth, Lind & Ponack, L.L.P.

(57) ABSTRACT

An optical recording medium that allows information to be recorded and played back properly, even when a type of recording medium in which information is recorded to grooves is used along with a type of recording medium in which information is recorded to lands, as well as a method for recording and playback with this medium. Recording track information is recorded in advance, indicating whether information is to be recorded in the grooves or the lands, whichever of the grooves and lands is best suited to the recording of information is selected on the basis of the recording track information that is read out, and the recording or playback of information is performed.

17 Claims, 6 Drawing Sheets

FOREIGN PATENT DOCUMENTS

| | | |
|---|---|---|
| JP | 2003-263779 | 9/2003 |
| JP | 2003-346379 | 12/2003 |
| JP | 2004-199757 | 7/2004 |
| JP | 2005-538494 | 12/2005 |
| WO | 2004/019331 | 3/2004 |

* cited by examiner

OPTICAL RECORDING MEDIUM, METHOD FOR MANUFACTURING THE SAME, RECORDING/PLAYBACK METHOD, AND RECORDING/PLAYBACK APPARATUS

BACKGROUND OF THE INVENTION

1. Field of the Invention

The present invention relates to an optical recording medium equipped with a recording layer that performs the recording and playback of information by irradiation with a laser beam or the like, and to a method for manufacturing the medium, a method for recording and playback with the medium, and an apparatus for recording and playback with the medium.

2. Background Information

Optical recording media have been drawing attention as a large-capacity, high-density memory. Such media come in an erasable type that allows the rewriting of information, and write once type that allows information to be recorded only once. One such erasable optical recording medium has as its recording layer a thin film on a substrate, and this film undergoes phase changes between amorphous and crystalline. The recording and playback of information is performed by means of thermal energy produced by irradiation with a laser beam.

Known phase changing materials that have been used for this recording layer include alloy films whose main component is germanium, antimony, tellurium, indium, or the like, such as a GeSbTe alloy. The recording of information is accomplished by forming marks through the partial amorphization of the recording layer, while erasure is performed by crystallizing these amorphous marks. The amorphization is performed by first heating the recording layer to its melting point or over, and then cooling it at a specific rate or faster. Crystallization, meanwhile, is performed by heating the recording layer to its crystallization temperature or over but below its melting point. The playback of information is performed by utilizing the difference in reflectance between these amorphous marks and the crystalline regions.

The general practice is to provide a substrate with spiral or concentric guide grooves for tracking a laser beam during recording and playback. The areas between the grooves are called lands. The information track is where information is recorded in either the grooves or on the lands, and whichever of these grooves and lands that is not used as the information track usually serves as a guard band for separating adjacent information tracks. For instance, with a Blu-ray Disc, information is recorded in the groove part of the information track, which is closer to the laser beam irradiation side.

FIG. 7 shows a conventional example of an optical recording medium in which information is recorded in the grooves. In FIG. 7, an optical recording medium 701 comprises a recording layer on a transparent substrate with a thickness of 1.1 mm, composed of a polycarbonate, and having in its center a center hole 702 for placing the disk in a recording and playback apparatus. A protective layer with a thickness of 0.1 mm is further provided over the recording layer. The recording and playback of information is performed by applying a laser beam through the protective layer. The substrate is provided with guide grooves for tracking the laser beam during recording and playback. The optical recording medium 701 also has a lead-in zone 704 used solely for playback, a test recording zone 705 where a learning operation is performed for determining the optimal pulse conditions, and an information recording zone 706 in which information is recorded.

More recently, the quantity of information handled has risen along with the processing capabilities of various kinds of information devices. Accordingly, there has been a need for a recording medium that is less expensive and affords higher density. An example of such a recording medium is a write once type of recording medium in which the recording layer is an organic dye film formed by spin coating.

FIG. 4a is a cross section of the main components in the radial direction of a write once type of recording medium, while FIG. 4b shows an example of forming a recording layer by spin coating. A recording medium 401 is created by forming a recording layer 433 over a substrate 436 having a thickness of 1.1 mm and equipped with an information track, and then forming a transparent protective layer 432 over this in a thickness of 0.1 mm. A laser beam 410 is applied through the protective layer 432 to perform the recording and playback of information. The recording layer 433 is formed by coating the substrate 436 with an organic dye 449 while rotating the substrate 436, which is disposed on a rotary table 448.

Here, the recording layer 433 is thicker in the concave lands 445 of the information track, and is thinner in the convex grooves 446, so signal quality is not high enough when information is recorded in the grooves 446.

In view of this, it is possible to improve signal quality by recording information in the concave lands 445. However, it is a problem for recording media with which information is recorded in the grooves 446 to co-exist with recording media with which information is recorded in the lands 445, as it becomes difficult to accommodate this situation on the recording and playback apparatus side.

It is an object of the present invention to solve the above problems encountered in the past, and to provide an optical recording medium that allows information to be recorded and played back with good signal quality for different types of recording medium, and to provide a method for manufacturing this medium, a method for recording and playback with this medium, and an apparatus for recording and playback with this medium.

SUMMARY OF THE INVENTION

To achieve the stated object, the present invention is an optical recording medium comprising a recording layer, in which the recording and playback of information is performed by irradiation with a laser beam, on a disk-shaped substrate provided with an information track made up of guide grooves for tracking a laser beam, wherein recording track information is recorded in advance, indicating whether information is to be recorded in the grooves of the information track, which are closer to the laser beam irradiation side, or on the lands, which are farther away from the laser beam irradiation side.

As a result, the recording and playback of information can be performed with good signal quality by reading the recording track information during use and selecting either the grooves or the lands.

To achieve the stated object, the present invention is an optical recording medium wherein recording track information is recorded in advance, indicating that information is to be recorded on the lands of the information track, which are farther away from the laser beam irradiation side.

As a result, the recording and playback of information can be performed with good signal quality by reading the recording track information during use and selecting the lands from the outset, which are farther away from the laser beam irradiation side where the film of the recording layer is thicker.

Further, the optical recording medium of the present invention is characterized in that tracking control is not necessary in the reading of the recording track information, and may be equipped with an identification information zone in which the recording track information is recorded. The recording track information is preferably recorded in the form of barcode that is a collection of radial lines.

This makes it easier to produce the substrate or to control the recording and playback apparatus.

Alternatively, the optical recording medium of the present invention may be equipped with a read-only lead-in zone in which the recording track information is recorded. The recording track information is preferably recorded in the lead-in zone by radially wobbling the guide grooves.

This makes it possible also to record recording track information on an optical recording medium not equipped with an identification information zone.

The optical recording medium of the present invention may have a plurality of recording layers.

This makes possible the production of a recording medium of higher density.

The recording layer of the optical recording medium of the present invention is preferably formed by spin coating, and is preferably composed of an organic dye-based recording material.

This makes possible the production of a recording medium at lower cost.

The method of the present invention for recording on an optical recording medium is a recording method in which the recording of information is performed by irradiating an optical recording medium with a laser beam, wherein the recording track information recorded on the optical recording medium is read, a determination as to whether the information is to be recorded in the grooves or on the lands is made on the basis of the recording track information, and the information is recorded on the basis of the determination.

The method of the present invention for playing back from an optical recording medium is a playback method in which the playback of information is performed by irradiating an optical recording medium with a laser beam, wherein the recording track information recorded on the optical recording medium is read, a determination as to whether the information has been recorded in the grooves or on the lands is made on the basis of the recording track information, and the information is played back on the basis of the determination.

These make it possible to record and play back information with good signal quality by reading the recording track information during use and selecting either the grooves or the lands.

With the optical recording medium of the present invention, the method for manufacturing the medium, the method for recording and playback with the medium, and the apparatus for recording and playback with the medium, whichever of the grooves and lands is best suited to the recording of information is selected according to the type of recording medium, which makes possible the recording and playback of information with better signal quality.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE INVENTION

The optical recording medium of the present invention, the method for manufacturing the medium, the method for recording and playback with the medium, and the apparatus for recording and playback with the medium will now be described through reference to the drawings.

Embodiment 1

Specific examples will now be given of the optical recording medium of the present invention. The recording media in this embodiment mainly perform the recording and playback of information by irradiating with a laser beam having a wavelength of approximately 405 nm and focused by an object lens with an NA of approximately 0.85.

Example 1

Figure 1:
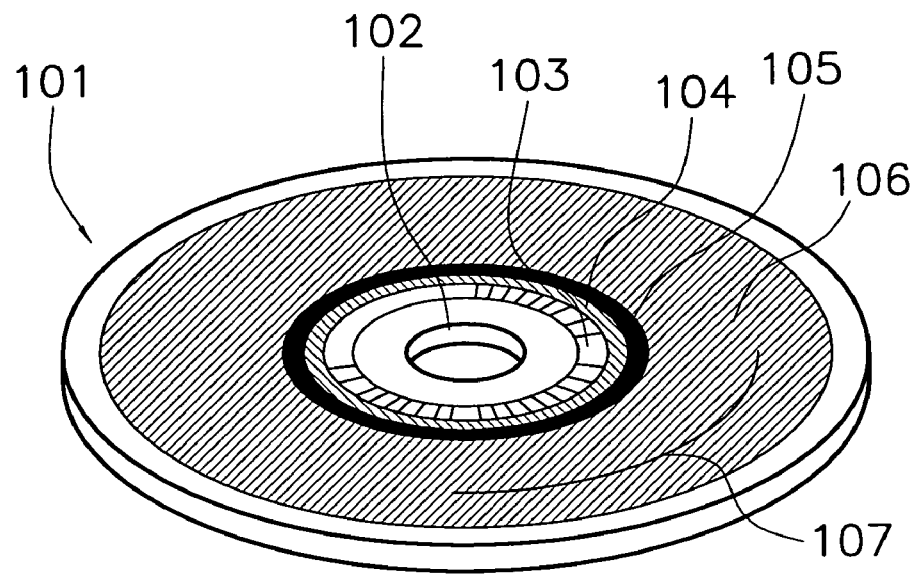
FIG. 1 is an oblique view of an optical recording medium in Example 1 of Embodiment 1 of the present invention.

FIG. 1 shows an optical recording medium 101, in which recording track information that indicates whether information is to be recorded in the grooves or the lands of the information track, or whether it is to be recorded in the lands, has been recorded in the form of barcode in an identification information zone.

The optical recording medium 101 has in its center a center hole 102 with a diameter of 15 mm for placing the disk in a recording and playback apparatus. A recording layer is provided on a transparent substrate with a thickness of 1.1 mm and a diameter of 120 mm and composed of a polycarbonate. A protective layer with a thickness of 0.1 mm is further provided over the recording layer. The recording and playback of information is performed by applying a laser beam through the protective layer from the opposite side of the substrate. The recording layer is composed of an organic dye or a GeSbTe alloy that is a phase-changing recording material, and recording marks are formed on the recording layer by irradiation with the laser beam.

The optical recording medium 101 has an identification information zone 103 for recording identification information about the recording medium and so forth, provided at a position of approximately 21 mm to 22 mm in the radial direction, a playback-only lead-in zone 104 provided at a position of approximately 22 mm to 23 mm in the radial direction, a test recording zone 105 for performing a learning operation to determine the optimal pulse conditions, provided at a position of approximately 23 mm to 24 mm in the radial direction, and an information recording zone 106 in which recording information is recorded, provided at a position of approximately 24 mm to 58 mm in the radial direction.

The test recording zone 105 and the information recording zone 106 are provided with an information track 107, which is made up of grooves disposed at a track pitch of approximately 0.32 μm, for tracking the laser beam during recording and playback. Recording track information indicating either whether information is to be recorded in the grooves of the information track 107, which are closer to the laser beam irradiation side, or on the lands, which are farther away from the laser beam irradiation side, or that information is to be recorded on the lands, is recorded in the identification information zone 103 in the form of barcode that is a collection of radial lines. Playback-only information is recorded in the playback-only lead-in zone 104 by radially wobbling grooves with a track pitch of approximately 0.35 μm and modulating the spatial frequency thereof.

Figure 8:
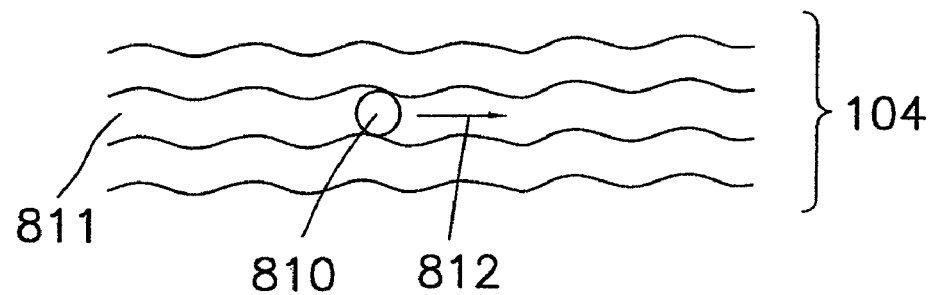
FIG. 8 is an enlarged detail plan view of the optical recording medium in Example 1 of Embodiment 1 of the present invention.

FIG. 8 is a simplified plan view of the track shape of the lead-in zone 104. A laser beam 810 that follows a track 811 is scanned in the direction of the arrow 812. The track 811 wobbles radially, and important information is included in the spatial frequency thereof. Accordingly, the track pitch is set to be greater than that in the information recording zone 106 in an effort to reduce crosstalk with the adjacent tracks and to improve the reliability of the information that is played back. The information track 107 in the test recording zone 105 and the information recording zone 106 is subjected to a specific frequency modulation and is radially wobbled in the recording of address information, and the rotation of the spindle motor of the recording and playback apparatus is controlled on the basis of the signal obtained from the wobble.

As a result of the above structure, the optical recording medium 101 of the present invention is able to record and play back information with good signal quality by reading the recording track information during use and selecting either the grooves or the lands. Furthermore, since the recording track information is recorded in the form of barcode, recording track information can be read out without any tracking control being performed, merely by focusing the laser beam on the recording layer while rotating the recording medium. Therefore, the information in the lead-in zone 104 may be recorded in either the grooves or the lands, and the same grooves as in the information recording zone 106 can be used, which makes it easier to produce the substrate or to control the recording and playback apparatus.

More specifically, with a type of recording medium in which information is recorded in the grooves, the grooves are wobbled in the formation of the information track 107, and the beam is tracked along these grooves, making possible the reading of address information or playback-only information. With a type of recording medium in which information is recorded in the lands, the lands are wobbled in the formation of the information track 107, and the beam is tracked along these lands, making possible the reading of address information or playback-only information. Therefore, with the recording medium of the present invention, recording track information is read, and a determination is made as to whether playback-only information or address information is recorded in the grooves or on the lands, and as a result, the recording or playback of information with good signal quality will be possible regardless of whether the recording medium is the type in which the information is recorded in the grooves or on the lands.

This effect will be more pronounced when the recording performance varies between the grooves and the lands, such as when a recording layer composed of an organic dye-based recording material is formed by spin coating. For instance, recording track information indicating that information is to be recorded in lands suited to the recording of information and that the recording film is thick may be recorded in advance.

Recording in the identification information zone 103 can be accomplished by partially eliminating, deforming, or discoloring the recording film by irradiation with a laser beam. Copyright information, information identifying an individual medium, and so forth may also be recorded in the identification information zone 103 in addition to the recording track information. The recording and playback conditions recommended by the manufacturer of the medium and other such information may be recorded in the lead-in zone 104.

A test recording zone may be provided around the outer periphery of the information recording zone. Furthermore, any variance in the recording characteristics distribution due to the radial position on the recording medium can be compensated for by providing a test recording zone around both the inner and outer peripheries of the information recording zone.

Example 2

Figure 2:
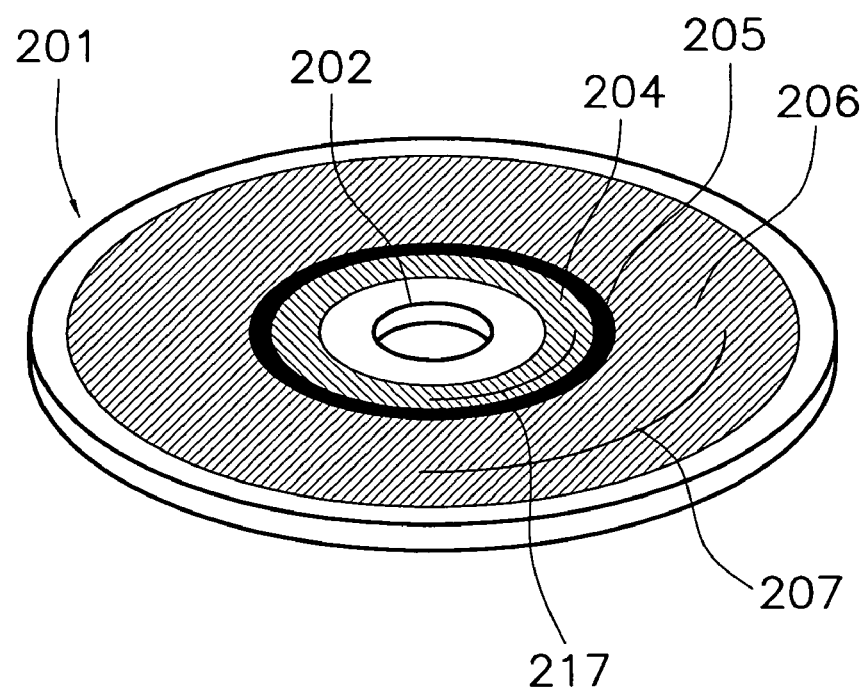
FIG. 2 is an oblique view of an optical recording medium in Example 2 of Embodiment 1 of the present invention.

FIG. 2 shows an optical recording medium 201, in which information indicating either whether information is to be recorded in the grooves or the lands of the information track, or that information is to be recorded in the lands, is recorded in the lead-in zone. Only part of the structure is different from that of the optical recording medium described in Example 1 and shown in FIG. 1.

The optical recording medium 201 has in its center a center hole 202 with a diameter of 15 mm for placing the disk in a recording and playback apparatus. A recording layer is provided on a transparent substrate with a thickness of 1.1 mm and a diameter of 120 mm and composed of a polycarbonate. A protective layer with a thickness of 0.1 mm is further provided over the recording layer. The recording and playback of information is performed by applying a laser beam through the protective layer from the opposite side of the substrate. The recording layer is composed of an organic dye or a GeSbTe alloy that is a phase-changing recording material, and recording marks are formed in the recording layer by irradiation with the laser beam.

The optical recording medium 201 has a playback-only lead-in zone 204 provided at a position of approximately 22 mm to 23 mm in the radial direction, a test recording zone 205 for performing a learning operation to determine the optimal pulse conditions, provided at a position of approximately 23 mm to 24 mm in the radial direction, and an information recording zone 206 in which recording information is recorded, provided at a position of approximately 24 mm to 58 mm in the radial direction.

The test recording zone 205 and the information recording zone 206 are provided with an information track 207, which is made up of grooves disposed at a track pitch of approximately 0.32 μm, for tracking the laser beam during recording and playback. The lead-in zone 204 is equipped with a medium information track 217 in which is recorded recording track information indicating either whether information is to be recorded in the grooves of the information track 207, which are closer to the laser beam irradiation side, or on the lands, which are farther away from the laser beam irradiation side, or that information is to be recorded on the lands.

Recording track information is recorded in the lead-in zone 204 by radially wobbling grooves with a track pitch of approximately 0.35 μm and modulating the spatial frequency thereof. The medium information track 217 wobbles so that it is possible to play back recording track information when tracking in the grooves. The information track 207 of the test recording zone 205 and the information recording zone 206 is subjected to a specific frequency modulation and is radially wobbled in the recording of address information, and the rotation of the spindle motor of the recording and playback apparatus is controlled on the basis of the signal obtained from the wobble. Here, with a type of recording medium in which information is recorded in the grooves, the grooves are wobbled to form the information track, making it possible to read address information or playback-only information when tracking in the grooves. With a type of recording medium in which information is recorded in the lands, the lands are wobbled to form the information track, making it possible to read address information or playback-only information when tracking in the lands.

As a result of the above structure, the optical recording medium 201 of the present invention is able to record and play back information with good signal quality by tracking in the grooves of the lead-in zone 204 and reading the recording track information during use, and selecting either the grooves or the lands, regardless of whether the recording medium is the type in which information is recorded in the grooves or in the lands.

The recording and playback conditions recommended by the manufacturer of the medium and other such information may be recorded in the lead-in zone 204. The test recording zone 205 may be provided around the outer periphery of the information recording zone 206. Furthermore, any variance in the recording characteristics distribution due to the radial position on the recording medium can be compensated for by providing the test recording zone 205 around both the inner and outer peripheries of the information recording zone 206.

Example 3

Figure 3A:
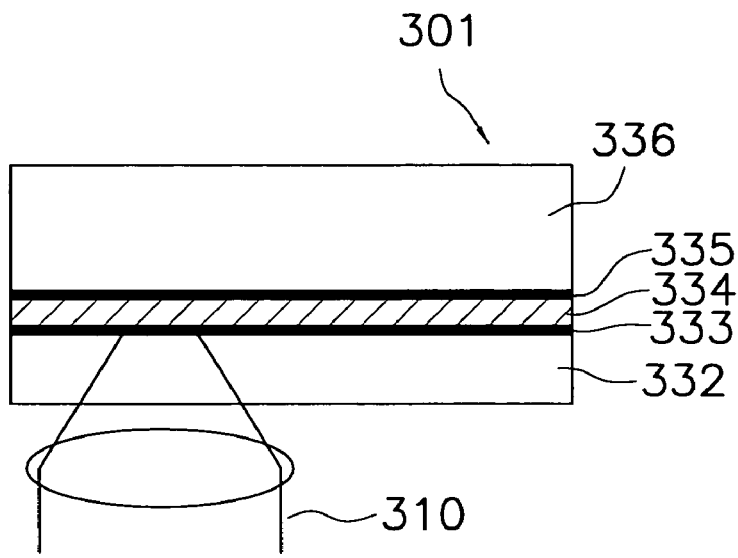
FIG. 3 consists of cross sections and an oblique view of an optical recording medium in Example 3 of Embodiment 1 of the present invention.

FIG. 3*a* shows an optical recording medium 301. The optical recording medium 301 has a one-sided, two-layer structure comprising two recording layers 333 and 335. The recording and playback of information on the two recording layers is performed from the same side by applying a laser beam 310 through a protective layer 332 from the opposite side of the substrate, and selectively focusing the beam on either the first recording layer 333 or the second recording layer 335. The recording layers 333 and 335 are separated from one another by a separating layer 334 with a thickness of approximately 0.03 mm, and these layers 333, 334, and 335 are sandwiched between the protective layer 332 (0.07 mm thick) and a substrate 336 (1.1 mm thick, 120 mm in diameter).

Figure 3B:
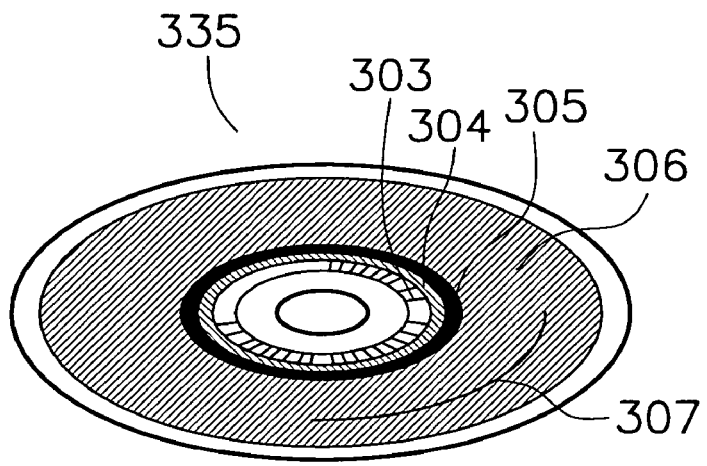

FIG. 3*b* shows the details of the recording layer 335. The recording layer 335 is the same as in Example 1 shown in FIG. 1 in that an identification information zone 303 for recording identification information about the recording medium and so forth is provided at a position of approximately 21 mm to 22 mm in the radial direction, a playback-only lead-in zone 304 is provided at a position of approximately 22 mm to 23 mm in the radial direction, a test recording zone 305 for performing a learning operation to determine the optimal pulse conditions is provided at a position of approximately 23 mm to 24 mm in the radial direction, and an information recording zone 306 in which recording information is recorded is provided at a position of approximately 24 mm to 58 mm in the radial direction. The test recording zone 305 and the information recording zone 306 are provided with an information track 307, which is made up of grooves disposed at a track pitch of approximately 0.32 μm, for tracking the laser beam during recording and playback. Recording track information indicating either whether information is to be recorded in the grooves of the information track 307, which are closer to the laser beam irradiation side in at least the information track 307, or on the lands, which are farther away from the laser beam irradiation side, or that information is to be recorded on the lands, is at least recorded in the identification information zone 303 in the form of barcode that is a collection of radial lines. Playback-only information is recorded in the lead-in zone 304 by radially wobbling grooves with a track pitch of approximately 0.35 μm and modulating the spatial frequency thereof.

The first recording layer 333 is constituted the same as the second recording layer 335 except for not being equipped with the identification information zone 303.

With a multilayer recording layer as in this example, in which there are a plurality of recording layers and the recording and playback of information is performed on these recording layers from just one side, whether to record in the grooves or the lands is decided for each recording layer, which makes it possible to use the recording layer material best suited to each recording layer, such as when an erasable recording layer and a write-once recording layer are used together, and thus the effect thereof is even more pronounced than when there is only one recording layer.

Figure 3C:
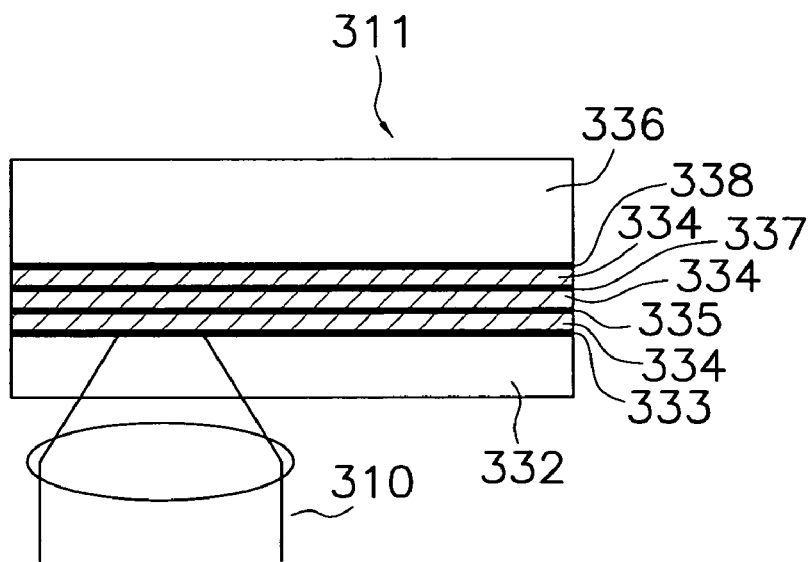
Figure 4A:
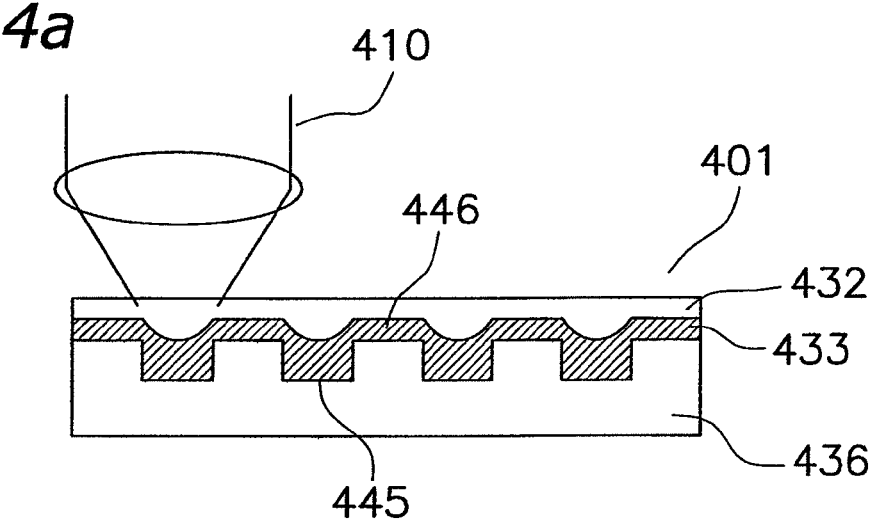
FIG. 4 consists of cross sections of a conventional optical recording medium and an example of forming a recording layer by spin coating.
Figure 4B:
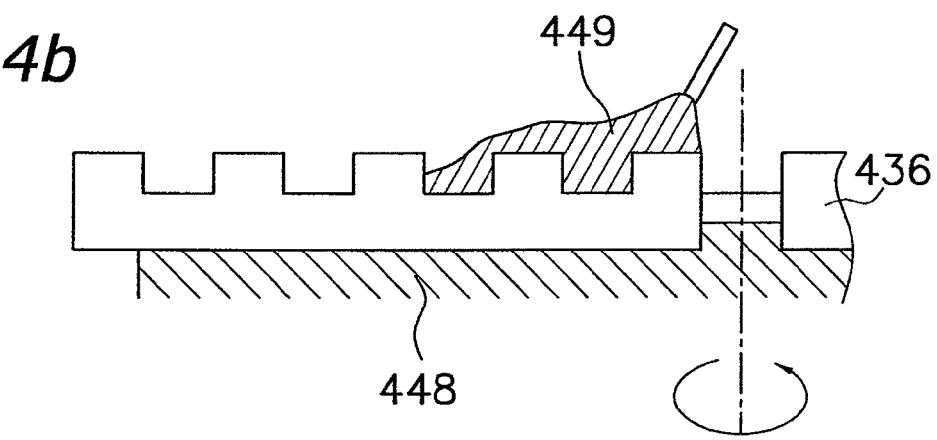

The identification information zone may be provided to just one recording layer, or it may be provided to both recording layers. Also, there may be three or more recording layers. An example is shown in FIG. 3*c*, in which an optical recording medium 311 has a one-sided four-layer structure comprising four recording layers 333, 335, 337, and 338. Other than there being four recording layers, the structure is the same as that of the optical recording medium 301 in FIG. 3*a*.

The shape of the optical recording media shown in Examples 1 to 3, and the radial positions, depth, groove width, and pitch of the tracks, can be suitably varied according to the performance of the recording and playback apparatus being used, and the characteristics of the recording film.

Embodiment 2

The method and apparatus for recording and playback with an optical recording medium of the present invention will now be described.

Figure 6:
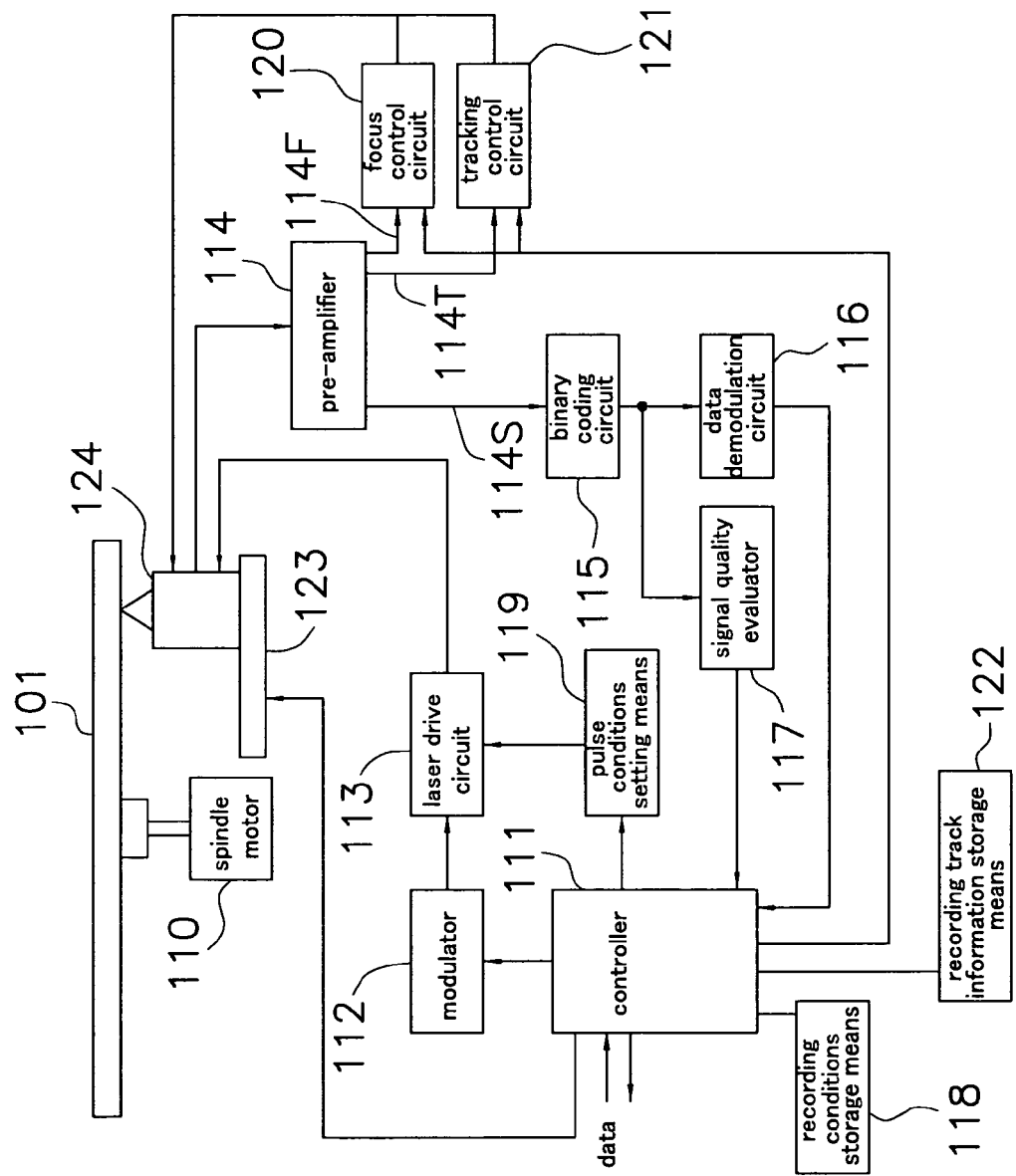
FIG. 6 is a block diagram of the structure of the apparatus of the present invention for recording to and playback from an optical recording medium.
Figure 7:
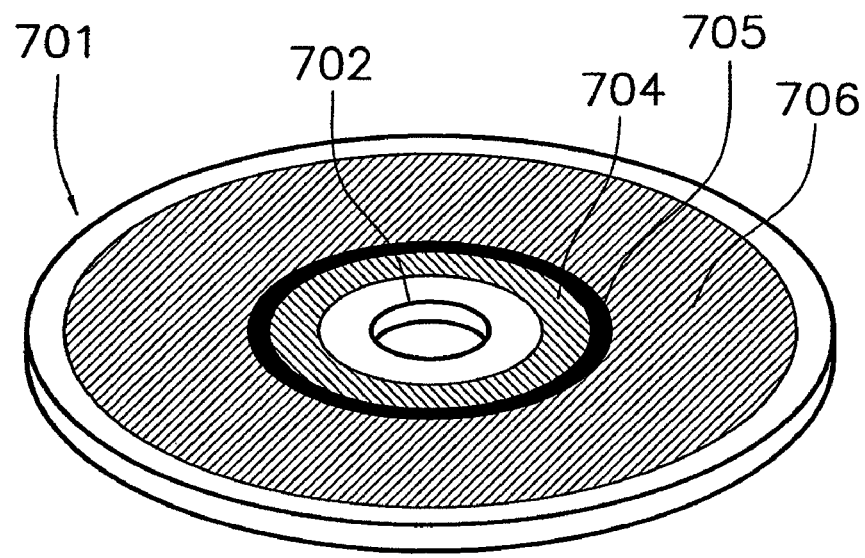
FIG. 7 is an oblique view of a conventional optical recording medium.

FIG. 6 is a block diagram schematically illustrating an example of the recording and playback apparatus used with the optical recording medium of the present invention, and illustrates a state in which the optical recording medium 101 shown in FIG. 1 has been installed.

This recording and playback apparatus comprises a spindle motor 110 on which a recording medium is installed and rotated; a controller 111; a modulator 112 that converts the data to be recorded into a recording signal; a laser drive circuit 113 that drives a semiconductor laser according to a recording signal; an optical head 124 that has a semiconductor laser, focuses a laser beam on the medium, performs the recording of information, and also produces a playback signal from reflected light; a pre-amplifier 114 that amplifies the playback signal and produces an information playback signal 114S, a focus error signal 114F, and a tracking error signal 114T; a binary coding circuit 115 that converts the information playback signal 114S into a binary-coded signal; a data demodulation circuit 116 that demodulates data from the binary-coded signal; a signal quality evaluator 117 that evaluates the quality of a signal produced by the test recording of specific data in a test recording zone of the medium; a recording conditions storage means 118 that stores the optimal recording conditions obtained by learning operation; a pulse conditions setting means 119 that controls laser pulses according to the recording conditions; a recording track information storage means 122 that stores recording track information read out from the optical recording medium 101; a focus control circuit 120 that controls the optical head 124 on the basis of the focus error signal 114F so that the laser beam will be focused on the recording layer of the optical recording medium 101; a tracking control circuit 121 that controls the optical head 124 on the basis of the tracking error signal 114T so that the laser beam will suitably scan the tracks of the optical recording medium 101; and a movement means 123 that moves the optical head 124 in the radial direction of the optical recording medium 101.

The focus error signal 114F here is produced by a standard method called an astigmatic method. The tracking error signal 114T is produced by a standard method called a push-pull method.

Figure 5:
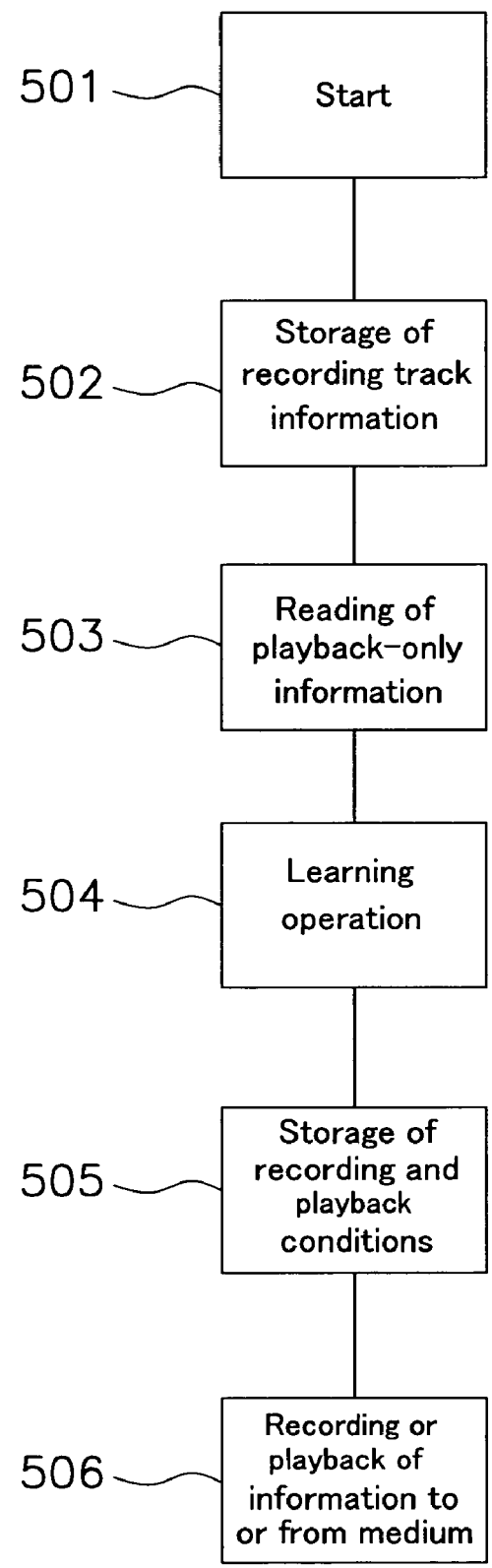
FIG. 5 is a flowchart of the method of the present invention for recording to and playback from an optical recording medium.

FIG. 5 is a flowchart illustrating a recording and playback method in which the recording and playback apparatus of FIG. 6 is used.

First, in the start-up step 501, the optical recording medium 101 is placed on the spindle motor 110 and rotated, after which an information-playback laser beam is emitted by the optical head 124, directed onto the optical recording medium 101, and focused on the recording layer. The identification information zone 103 on the optical recording medium 101 is accessed, and the recording track information and so forth recorded in the identification information zone 103 is read. The reading of the recording track information and so forth is accomplished by using the data demodulation circuit 116 to demodulate the signal that was binary-coded by the binary coding circuit 115 in which the information playback signal 114S obtained from the light reflected from the optical recording medium 101 by the optical head 124 has been set to a predetermined binary-coding slice level, and then sending this demodulated signal to the controller 111. As a result, the recording track information recorded on the optical recording medium is read.

Next, in the recording track information storage step 502, the above-mentioned recording track information is stored in the recording track information storage means 122.

In the playback-only information reading step 503, the lead-in zone 104 is accessed, the laser beam is tracked in the grooves or lands of the track on the basis of the recording track information, and the playback-only information of the medium (such as copyright information, medium identification information, or recommended recording conditions) recorded in the lead-in zone 104 is read.

Next, in the learning operation step 504, the optimal recording and playback conditions are determined by the following procedure. First, the optical head 124 is moved and the test recording zone 105 is accessed. The controller 111 sets the pulse conditions setting means 119 to specific predetermined conditions or to conditions designated by the playback-only information of the medium. The specific data outputted from the controller 111 is then converted by the modulator 112 into a laser drive signal, and the laser drive circuit 113 drives the semiconductor laser disposed in the optical head 124 according to this laser drive signal. The optical head 124 focuses the light emitted from the semiconductor laser on the optical recording medium 101, the beam is tracked in the grooves or lands of the track on the basis of the recording track information, and a test signal is recorded in the test recording zone 105 of the optical recording medium 101.

The jitter value (the amount of fluctuation of the reproduced signal position versus a clock that serves as a reference) of the signal produced when the binary coding circuit 115 binary-codes a playback signal of the data test-recorded in this fashion is measured by the signal quality evaluator 117 and compared to a predetermined evaluation criterion to evaluate the signal quality. If the jitter value satisfies the evaluation criterion, the learning operation step 504 is concluded. If the jitter value does not satisfy the evaluation criterion, the pulse conditions are successively varied to evaluate the signal quality of the test-recorded data and the test recording of the specific data. This operation is repeated until the jitter value satisfies the evaluation criterion, thereby finding the optimal recording conditions.

Next, in the recording and playback conditions storage step 505, the optimal recording conditions obtained in the learning operation step 504 are stored in the recording conditions storage means 118.

Finally, in the information recording and playback step 506, the pulse conditions are set on the basis of the optimal recording conditions, the laser beam is tracked in the grooves or lands of the track on the basis of the recording track information, and information is recorded to or played back from the information recording zone 106. That is, a determination as to whether the information is recorded in the grooves or the lands is made on the basis of the recording track information, and the recording and playback of information is performed on the basis of this determination.

With the recording and playback method of the present invention, the result of the above configuration is that the recording and playback of information with good signal quality is possible by reading the recording track information during use and selecting either the grooves or the lands. Furthermore, since the recording track information is recorded in the form of barcode, it is possible to read the recording track information without performing any tracking control, merely by focusing the laser beam on the recording layer while rotating the recording medium. Therefore, the information in the lead-in zone may be recorded to either the grooves or the lands, and the groove portion can be the same as in the information recording zone, which makes it easier to produce the substrate or to control the recording and playback apparatus.

More specifically, with a type of recording medium in which information is recorded in the grooves, the grooves are wobbled in the formation of the information track, and the beam is tracked along these grooves, making possible the reading of address information or playback-only information. With a type of recording medium in which information is recorded in the lands, the lands are wobbled in the formation of the information track, and the beam is tracked along these lands, making possible the reading of address information or playback-only information. Therefore, with the recording and playback apparatus of the present invention, whether to record in the grooves or the lands can be correctly selected and information can be recorded and played back properly even if both types of medium are used. The effect thereof will be particularly pronounced when the recording performance of the recording layer varies between the grooves and the lands, such as with an organic dye-based recording material is formed by spin coating.

Further, regardless of whether information is recorded in the grooves or the lands in the information recording zone, recording track information may be recorded in the lead-in zone if playback-only information is recorded as predetermined in just the grooves or the lands in the lead-in zone.

The optical recording medium relating to the present invention, the method for manufacturing the same, and the method and apparatus for recording to and playing back from the same are such that recording track information indicating either whether information is to be recorded in the grooves or the lands of the information track, or that information is to be recorded in the lands, is recorded on a recording medium, the effect of which is that whichever of the grooves and lands is best suited to the recording of information is selected according to the type of recording medium, which is useful in large-capacity information recording apparatus and the like.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An optical recording medium comprising a recording layer, in which the recording and playback of information is performed by irradiation with a laser beam, on a substrate provided with an information track made up of guide grooves for tracking a laser beam,
    wherein the thickness of the recording layer in the grooves of the information track, which are closer to the laser beam irradiation side, is different from the thickness of the recording layer on the lands, which are farther away from the laser beam irradiation side, and
    wherein a recording track information is recorded thereon indicating whether the recording layer in the grooves or on the lands is to be selected as a recording track, the recording track information for selecting the recording layer being based on whether the recording layer is thicker in the grooves than on the lands and whether the recording layer is thicker on the lands than in the grooves.

2. The optical recording medium according to claim 1, wherein the recording layer is thicker on the lands of the information track, which are farther away from the laser beam irradiation side, than in the grooves, which are closer to the laser beam irradiation side, and
    wherein a recording track information is recorded thereon, indicating that the recording layer on the lands is a recording track, the recording layer on the lands being a recording track.

3. The optical recording medium according to claim 1, wherein tracking control is not necessary in the reading of the recording track information.

4. The optical recording medium according to claim 3, further comprising an identification information zone in which the recording track information is recorded.

5. The optical recording medium according to claim 4, wherein the recording track information is recorded in the form of a barcode that is a collection of radial lines.

6. The optical recording medium according to claim 1, further comprising a read-only lead-in zone in which the recording track information is recorded.

7. The optical recording medium according to claim 6, wherein the recording track information is recorded in the lead-in zone by radially wobbling the guide grooves.

8. The optical recording medium according to claim 1, wherein the recording layer is irradiated with a laser beam from the surface on the opposite side from the substrate.

9. The optical recording medium according to claim 1, having a plurality of the recording layers.

10. The optical recording medium according to claim 1, wherein the recording layer is formed by spin coating.

11. The optical recording medium according to claim 10, wherein the recording layer is composed of an organic dye-based recording material.

12. A method for manufacturing an optical recording medium, the optical recording medium comprising a recording layer, in which the recording and playback of information is performed by irradiation with a laser beam, on a substrate provided with an information track made up of guide grooves for tracking a laser beam, the method comprising:
    making the thickness of the recording layer in the grooves of the information track, which are closer to the laser beam irradiation side, different from the thickness of the recording layer on the lands, which are farther away from the laser beam irradiation side, and
    recording track information thereon indicating whether the recording layer in the grooves or on the lands is to be selected as a recording track, the recording track information for selecting the recording layer being based on whether the recording layer is thicker in the grooves than on the lands and whether the recording layer is thicker on the lands than in the grooves.

13. The method for manufacturing according to claim 12, wherein the recording layer is made thicker on the lands of the information track, which are farther away from the laser beam irradiation side, than in the grooves, which are closer to the laser beam irradiation side, and
    wherein a recording track information is recorded thereon, indicating that the recording layer on the lands is a recording track, the recording layer on the land being a recording track.

14. A method for recording on an optical recording medium, the optical recording medium comprising a recording layer, in which the recording and playback of information is performed by irradiation with a laser beam, on a substrate provided with an information track made up of guide grooves for tracking a laser beam,
    wherein the thickness of the recording layer in the grooves of the information track, which are closer to the laser beam irradiation side, is different from the thickness of the recording layer on the lands, which are farther away from the laser beam irradiation side, and a recording track information is recorded thereon indicating whether the recording layer in the grooves or on the lands is to be selected as a recording track, the recording track information for selecting the recording layer being based on whether the recording layer is thicker in the grooves than on the lands and whether the recording layer is thicker on the lands than in the grooves, the method comprising:
    reading the recording track information recorded on the optical recording medium;
    determining whether the information is to be recorded in the grooves or on the lands on the basis of the recording track information; and
    recording the information on the basis of the determination.

15. A method for playing back information recorded on an optical recording medium, the optical recording medium comprising a recording layer, in which the recording and playback of information is performed by irradiation with a laser beam, on a substrate provided with an information track made up of guide grooves for tracking a laser beam, wherein the thickness of the recording layer in the grooves of the information track, which are closer to the laser beam irradiation side, is different from the thickness of the recording layer on the lands, which are farther away from the laser beam irradiation side, and a recording track information is recorded thereon indicating whether the recording layer in the grooves or on the lands is to be selected as a recording track, the recording track information for selecting the recording layer being based on whether the recording layer is thicker in the grooves than on the lands and whether the recording layer is thicker on the lands than in the grooves, the method comprising:

reading the recording track information recorded on the optical recording medium;

determining whether the information has been recorded in the grooves or on the lands on the basis of the recording track information; and playing back the information on the basis of the determination.

16. An information recording apparatus for recording on an optical re-cording medium, the optical recording medium comprising a recording layer, in which the recording and playback of information is performed by irradiation with a laser beam, on a substrate provided with an information track made up of guide grooves for tracking a laser beam, wherein the thickness of the recording layer in the grooves of the information track, which are closer to the laser beam irradiation side, is different from the thickness of the recording layer on the lands, which are farther away from the laser beam irradiation side, and a recording track information is recorded thereon indicating whether the recording layer in the grooves or on the lands is to be selected as a recording track, the recording track information for selecting the recording layer being based on whether the recording layer is thicker in the grooves than on the lands and whether the recording layer is thicker on the lands than in the grooves, said recording apparatus comprising:

a reading unit for reading the recording track information recorded on the optical recording medium;

a determination unit for determining whether the information is to be recorded in the grooves or on the lands on the basis of the recording track information; and a recording unit for recording information on the basis of the determination.

17. An information playback apparatus for playing back information re-corded on an optical recording medium, the optical recording medium comprising a recording layer, in which the recording and playback of information is performed by irradiation with a laser beam, on a substrate provided with an information track made up of guide grooves for tracking a laser beam, wherein the thickness of the recording layer in the grooves of the information track, which are closer to the laser beam irradiation side, is different from the thickness of the recording layer on the lands, which are farther away from the laser beam irradiation side, and a recording track information is recorded thereon indicating whether the recording layer in the grooves or on the lands is to be selected as a recording track, the recording track information for selecting the recording layer being based on whether the recording layer is thicker in the grooves than on the lands and whether the recording layer is thicker on the lands than in the grooves, said playback apparatus comprising:

a reading unit for reading the recording track information recorded on the optical recording medium;

a determination unit for determining whether the information has been recorded in the grooves or on the lands on the basis of the recording track information; and a playback unit for playing back information on the basis of the determination.

* * * * *